UNITED STATES PATENT OFFICE.

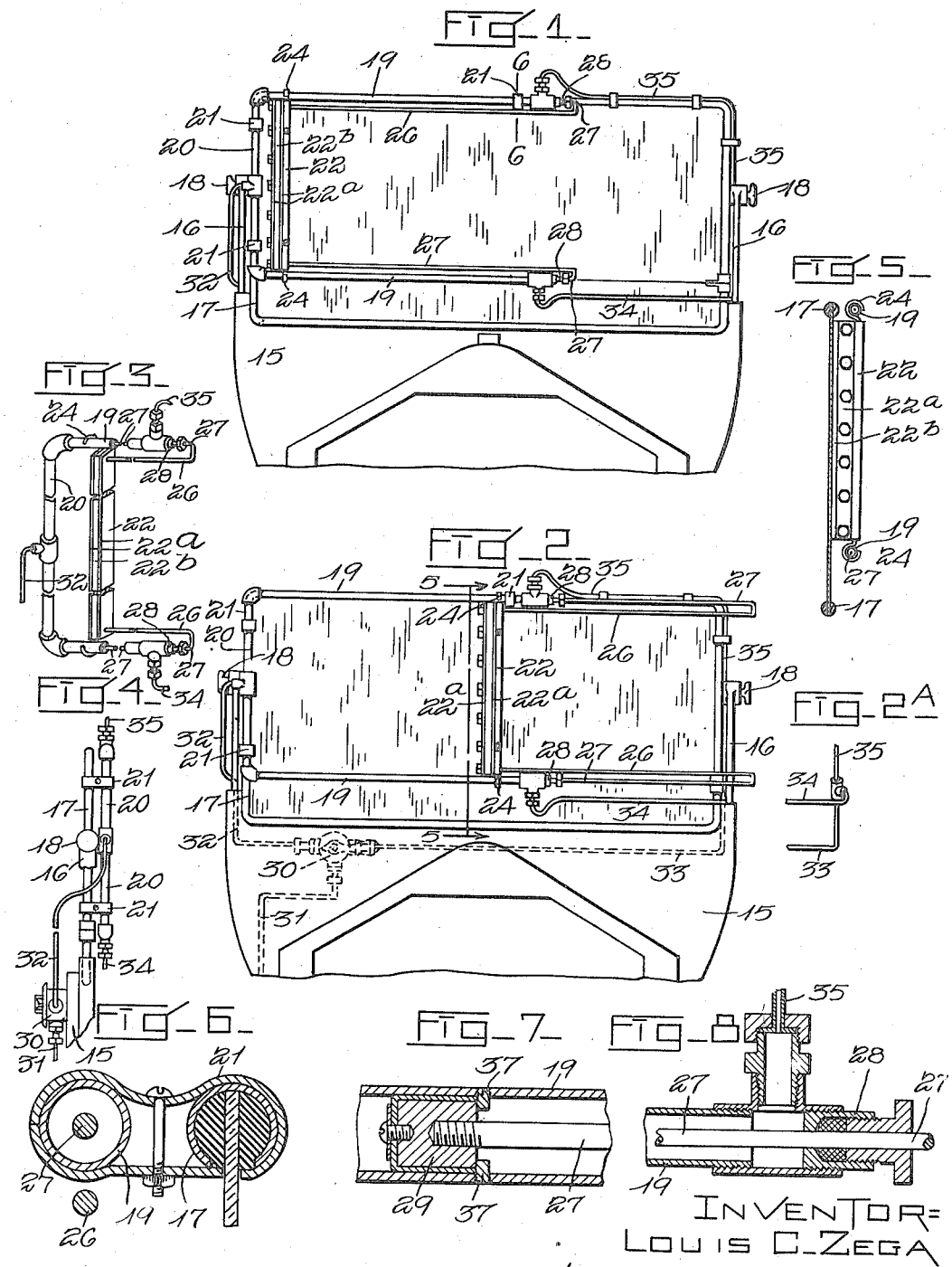

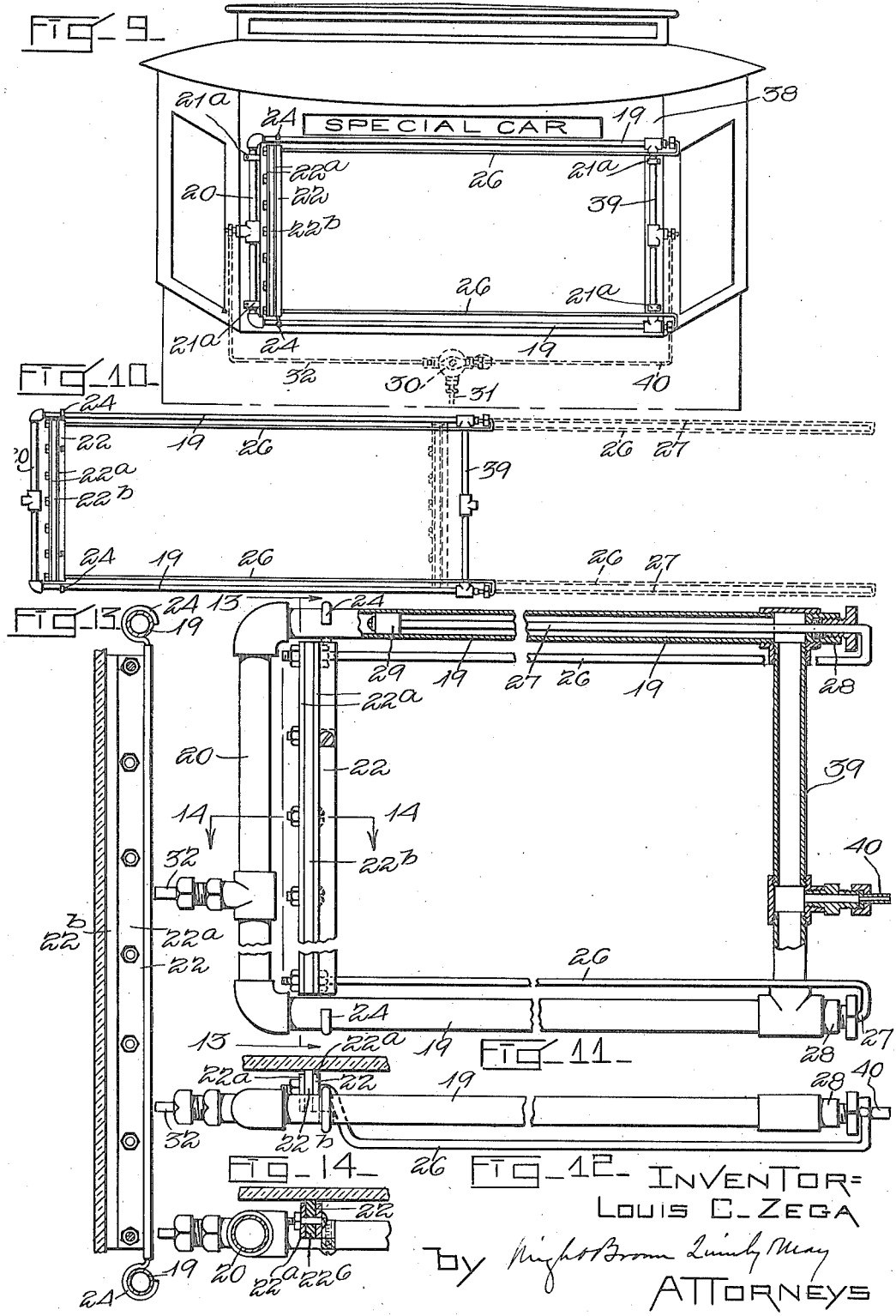

LOUIS C. ZEGA, OF EVERETT, MASSACHUSETTS, ASSIGNOR TO AMELIA F. PRAY, OF EVERETT, MASSACHUSETTS.

WINDOW-CLEANING ATTACHMENT FOR VEHICLES.

1,180,683.  Specification of Letters Patent.  Patented Apr. 25, 1916.

Application filed December 22, 1915. Serial No. 68,218.

*To all whom it may concern:*

Be it known that I, LOUIS C. ZEGA, a subject of the King of Italy, residing at Everett, in the county of Middlesex and State of Massachusetts, have invented new and useful Improvements in Window-Cleaning Attachments for Vehicles, of which the following is a specification.

This invention relates to means including a reciprocating wiper, operable by compressed air or other fluid, for cleaning the outer sides of windows on vehicles, such as automobiles, street railway cars, etc., to remove vision obscuring accumulations thereon.

The term window as used herein is intended to include an automobile wind shield composed of a frame and glass held thereby.

The invention is embodied in the improvements hereinafter described and claimed.

Of the accompanying drawings forming a part of this specification: Figure 1 represents an elevation of a part of the front end of an automobile having a wind shield, and a cleaning attachment embodying my invention associated therewith, the wiper being at one end of its stroke; Fig. 2 represents a view similar to Fig. 1, showing the wiper at the opposite end of its stroke; Fig. 2ª represents a fragmentary perspective view showing a portion of one of the air conduits; Fig. 3 represents a perspective view of the wiper and the frame which guides it detached from the wind shield frame; Fig. 4 represents an end view of the wind shield and the wiper guiding frame thereon; Fig. 5 represents a section on line 5—5 of Fig. 2; Fig. 6 represents a section on line 6—6 of Fig. 1; Fig. 7 represents a fragmentary longitudinal section showing a portion of one of the cylinders hereinafter described and the piston therein; Fig. 8 represents a fragmentary longitudinal section showing another portion of said cylinder and a portion of one of the air conduits communicating therewith; Fig. 9 represents a front elevation of another form of attachment embodying my invention, attached to the vestibule of a street car, the wiper being at one end of its stroke; Fig. 10 represents a view similar to Fig. 9, omitting the vestibule and showing the wiper at the opposite end of its stroke, by dotted lines; Fig. 11 represents an enlargement of Fig. 10, parts being broken away and parts shown in section; Fig. 12 represents a top view of the attachment as shown by Fig. 11; Fig. 13 represents a section on line 13—13 of Fig. 11; Fig. 14 represents a section on line 14—14 of Fig. 11.

The same reference characters indicate the same or similar parts in all the views.

Referring first to Figs. 1 to 8 inclusive, 15 represents the body of an automobile provided with standards 16 to which the frame 17 of a wind shield is pivoted at 18. To the wind shield frame 17 is secured a wiper guiding frame composed of two parallel spaced-apart cylinders 19 and a transverse tubular connecting member 20, said frame being open at one end and closed at the opposite end by the member 20, as best shown by Fig. 3. Said wiper guiding frame is adapted to be attached as a whole or as a single part to the wind shield frame, and as here shown is so attached by means of clamps 21, which may be constructed as shown by Fig. 6. As shown by Figs. 1 and 2, the clamps 21 secure one of the cylinders to the upper member of the wind shield frame, and the tubular member 20 to one of the end members of the wind shield frame, the other cylinder 19 extending along a portion of the wind shield without direct attachment thereto.

22 represents a wiper formed to extend across the space between the cylinders 19, said wiper as here shown being composed of metal strips 22ª and a strip 22ᵇ of yielding or compressible material such as felt clamped between the strips 22ª and bearing at one edge against the glass of the wind shield. To the opposite ends of the wiper are attached runners 24, preferably formed as hooks adapted to slide loosely on the cylinders 19. To the opposite ends of the wiper are attached two U-shaped piston rods, each composed of an inner arm 26 attached to the wiper and an outer arm 27. Said outer arms extend through stuffing boxes 28 at the open ends of the wind shield guiding frame, and are secured to pistons 29 (Fig. 7) adapted to reciprocate in the cylinders 19. The pistons 29 are adapted to be reciprocated in the cylinders 19 by compressed air, which may be stored in a tank (not shown) on the body 15, and is supplied to and released from the cylinders by the means next described.

30 (Fig. 2) represents a valve attached to the body 15 and preferably to the inner side of the dash portion thereof below the wind shield. A supply conduit 31 communicating with the tank or reservoir admits air to the valve. Said valve is connected by a single conduit 32 with the tubular member 30 of the wind shield guiding frame, said member 20 communicating with the cylinders 19. A conduit 33 having branches 34, 35, (Fig. 2ª) communicates with the valve and with the cylinders 19 at the open end of the wind shield guiding frame.

The valve 30 is a three-way valve of well known construction adapted to admit air to either of the conduits 32 and 33, and to permit air to escape from the other conduit. When the wiper is at the end of its stroke represented by Fig. 1, the valve is manipulated to permit air to pass through the conduit 32 and the tubular member 20 to the cylinders 19 at the closed end of the frame. At the same time the valve opens a communication between the conduit 33 and the atmosphere. The air pressure therefore drives the wiper to the position shown by Fig. 2, and causes the wiper to clean a portion of the glass of the wind shield. When the valve is manipulated to reverse the connections the wiper is driven back to the position shown by Fig. 1.

It will be seen that the two cylinders, the pistons therein and the two U-shaped piston rods positively control the wiper so that it is always at right angles with the cylinders and cannot swing from said position. The conduit 32 and the conduit branch 35 are sufficiently flexible to permit the wiper guiding frame, clamped as described to the wind shield, to conform to the swinging movements of the wind shield. The cylinders 19 may be provided with stops 37 (Fig. 7) to limit the movement of the pistons 29 in one direction.

When the invention is embodied in the attachment for the vestibule 38 of a street car, as shown by Figs. 9 to 14 inclusive, the wind shield guiding frame, including the cylinders 19 and transverse connecting member 20, is closed at both ends of the frame, the member 20 closing one end as in the construction first described, and the opposite end being closed by a transverse tubular connecting member 39.

Instead of employing a branched conduit 33 I connect the valve 30 with the tubular connecting member 39 by a single conduit 40, the member 39 constituting a connection between the conduit 40 and the cylinders 19. The clamps 21ª connect the wind shield guiding frame directly with the vestibule 38.

Each embodiment of the invention includes a frame adapted to be conveniently and quickly applied and removed as a unit, and adapted to guide both ends of the wiper so that the latter is held in a position at right angles with its path of movement, and cannot swing or tip from said position, the cylinders which conduct the compressed air to and from the pistons being the guiding portions of the frame.

Having described my invention, I claim:

1. A window cleaning attachment comprising two parallel spaced-apart cylinders rigidly connected and forming parts of a frame-like structure adapted to be attached as a whole to supporting means on a vehicle and formed to expose a window thereon, a wiper extending across the space between the cylinders and provided with runners movable thereon, U-shaped piston rods having inner arms attached to the opposite ends of the wiper, and outer arms provided with pistons movable in said cylinders, and air conduits communicating with the opposite ends of the cylinders whereby compressed air may be admitted simultaneously to the cylinders at either end of said frame and released from the cylinders at the opposite end, the said pistons and U-shaped rods acting conjointly to prevent swinging movements of the wiper.

2. A window cleaning attachment comprising two parallel spaced-apart cylinders, a tubular member connecting the cylinders at one end and forming therewith a rigid U-shaped frame closed at one end by said member and open at the opposite end, said frame being adapted to be attached as a whole to a wind shield frame, a wiper extending across the space between the cylinders and provided with runners movable thereon, U-shaped piston rods having inner arms attached to the opposite ends of the wiper, and outer arms provided with pistons movable in said cylinders, a single air conduit communicating with said tubular member, and a branched air conduit communicating with the cylinders at the open end of the frame, whereby compressed air may be admitted simultaneously to the cylinders at either end of the frame and released therefrom at the opposite end.

3. A window cleaning attachment comprising two parallel spaced-apart cylinders, a tubular member connecting the cylinders at one end and forming therewith a rigid U-shaped frame closed at one end by said member and open at the opposite end, said frame being adapted to be attached as a whole to a wind shield frame, a wiper extending across the space between the cylinders and provided with runners movable thereon, U-shaped piston rods having inner arms attached to the opposite ends of the wiper, and outer arms provided with pistons movable in said cylinders, a single air conduit communicating with said tubular member, and a branched air conduit communicating with the cylinders at the open end of the frame, whereby compressed air may be admitted simultaneously to the cylinders at either end of the frame and released therefrom at the opposite end, said conduits having flexible portions permitting the attachment to swing with a hinged wind shield.

4. In combination, an automobile body, a hinged wind shield, a wiper guiding frame closed at one end and open at the other end comprising two spaced-apart parallel cylinders and a transverse tubular member connecting the cylinders, clamps connecting the wiper guiding frame with portions of the wind shield frame, a wiper extending across the space between the cylinders and provided with runners movable thereon, U-shaped piston rods having inner arms attached to the opposite ends of the wiper, and outer arms provided with pistons movable in said cylinders, a single air conduit communicating with said connecting member, and a branched air conduit communicating with the cylinders at the open end of the wiper guiding frame, clamps connecting one of said branches with other portions of the wind shield frame, and a controlling valve on said body communicating with said conduits, the conduits being provided with flexible portions permitting swinging movements of the two frames.

In testimony whereof I have affixed my signature.

LOUIS C. ZEGA.